July 9, 1940.   A. R. KIRKPATRICK   2,207,487
MEASURING LINE WIPER AND OILER
Filed Aug. 15, 1938
Fig.1
Fig.2
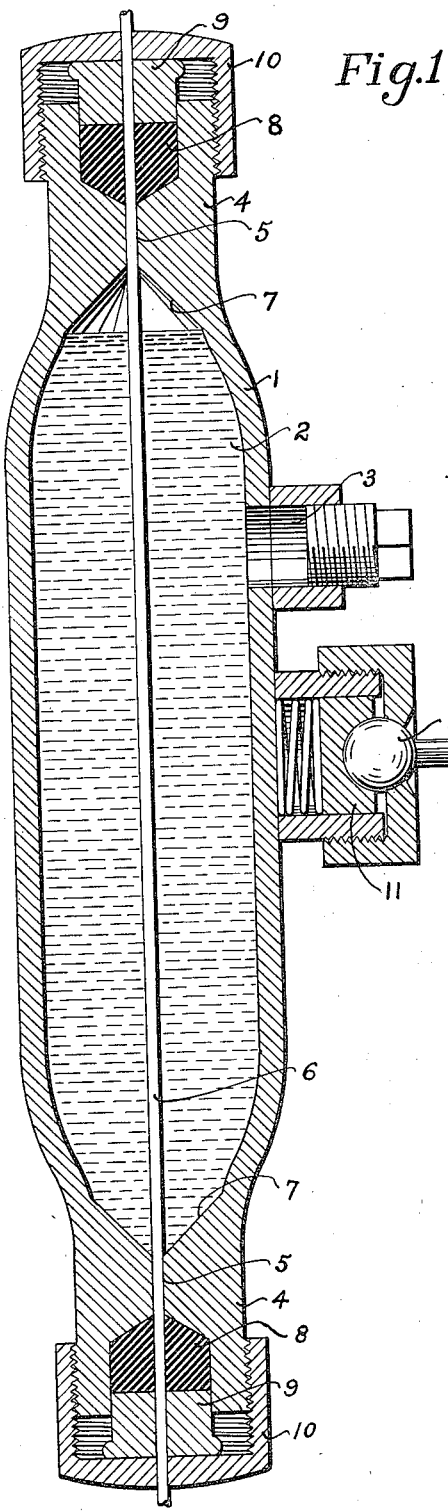
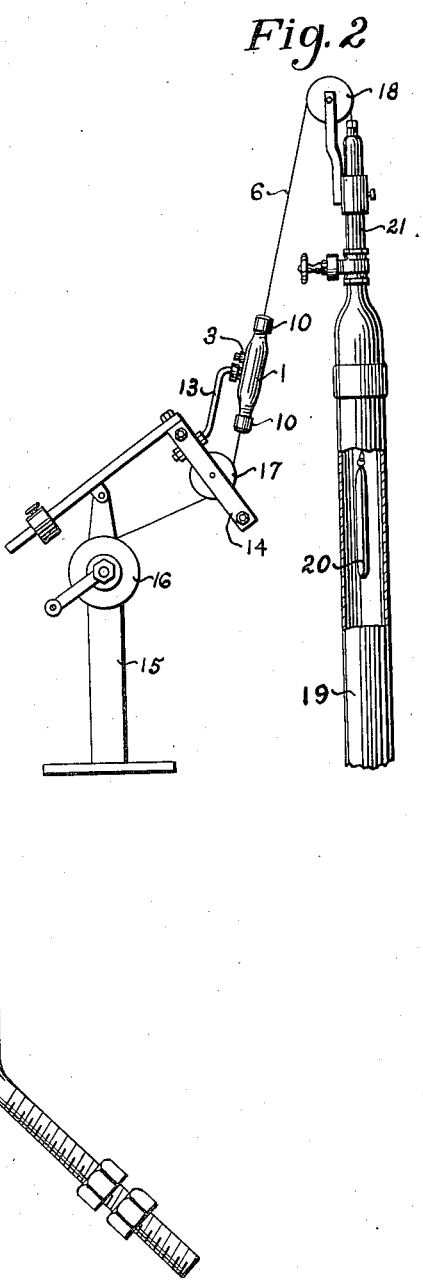
INVENTOR.
Autry R. Kirkpatrick
BY
ATTORNEY.

Patented July 9, 1940

2,207,487

UNITED STATES PATENT OFFICE 2,207,487

MEASURING LINE WIPER AND OILER

Autry R. Kirkpatrick, Wichita Falls, Tex.

Application August 15, 1938, Serial No. 225,011

2 Claims. (Cl. 91—32)

This invention relates to an improvement in measuring line wipers and oilers, particularly for use in connection with measuring lines for deep wells.

In the drilling of deep wells, the use of a measuring line with which to determine the exact depth and the inclination of the well and also for the location of the desired point for an explosive charge, has become a necessity. Such a measuring line usually is made of a small round steel wire of high tensile strength, which line is quite expensive and must be maintained in good shape, kept free of mud or rust or other corrosive material, and properly supported on a reel, in order to obtain the best results and the longest wear therefrom.

Heretofore, the standard practice of treating such a measuring line was to pour oil over the line as it passed into the well or was withdrawn therefrom, a proceeding which is both expensive and hazardous, as it wasted oil, and caused the waste oil to be thrown onto the derrick floor, thus creating a slippery work surface which is dangerous to the workman, as well as unsightly and untidy.

The primary object of this invention is to provide a simple and effective way of wiping the measuring line free from mud or other foreign matter, and depositing a film of oil thereon each time that it passes into or out of the well.

Another object of the invention is to provide a measuring line wiper and oiler which is compact, light in weight, durable in construction, and which confines the lubricant to the place of use, and which wiper and oiler may be readily attached to or detached from the line without the necessity of disassembling the device.

Still another object of this invention is to provide a universal mounting for a measuring line wiper and oiler, so that it will work readily in any position without causing undue strain on the line while it is passing therethrough.

In carrying out these objects, I utilize a tubular or cylindrical receptacle, which may be filled with oil or other lubricant to the desired extent and through which the measuring line passes. Effective packings are provided at opposite ends of the receptacle so as to remove the mud or other foreign matter from the measuring line and to permit the application to the line of sufficient lubricant to maintain it in good condition. This receptacle is universally supported so that the wiper and oiler will accommodate itself to the pitch or inclination or direction of movement of the measuring line.

A preferred embodiment of the invention is illustrated in the accompanying drawing, in which:

Fig. 1 is a longitudinal sectional view through the wiper and oiler, with parts in elevation; and Fig. 2 is a side elevation, partly in section, showing the oiler and wiper applied to a line of a well.

Referring particularly to Fig. 1 of the drawing, the device comprises a body or casing designated generally by the numeral 1, and which is approximately cylindrical and long and narrow, having a reservoir 2 therein adapted to contain oil or other lubricant, which reservoir extends throughout the major portion of the length of the casing. A plugged opening 3 is provided in a side of the reservoir 2 for the purpose of filling the reservoir with lubricant.

Each opposite end portion of the casing 1 is reduced somewhat in diameter, as shown at 4, with a passageway 5 therethrough for the line which is designated 6. The opposite ends of the oil reservoir 2 are tapered approximately in conical shape, and designated by the numeral 7, each of which has its apex approximately at the orifice 5, for the purpose of facilitating the threading of the line therethrough, directing the line into the orifice and through the packing at the corresponding end of the device.

At each end of the device, the reduced end portion 4 is provided with a recess therein, at the outer end of the orifice 5 which receives a packing element 8, preferably of resilient material such as rubber, because this gives an increased pressure on the measuring line passing therethrough and may have the wiping action thereof adjustable, as provided herein. A gland 9 is inserted into the recess that receives the packing material 8, and which gland 9 is pressed inwardly against the packing material by a stuffing box cap 10 screw-threaded onto the outer end of the portion 4. Thus the cap 10 acts through the gland 9 to apply a compressing action to the resilient packing material 8 with sufficient force to wipe the desired amount of oil from the measuring line passing therethrough and through the orifice 5, while at the same time wiping the line free of any mud or foreign matter that may be contained therein, one end of the device serving to remove the mud and foreign matter, while the other end serves to remove excess oil or lubricant from the line as it passes through and out of the casing 1.

The measuring line is threaded through the stuffing boxes at opposite ends and through the reservoir 2 in said casing, being forced through first one stuffing box and then the other, the conical end 7 adjacent the latter stuffing box, serving to direct the measuring line into the orifice 5 and through the stuffing box at the remote end. After the device is thus applied to the measuring line and the latter used in a well, as the line passes through the reservoir 2 and out through the stuffing box, at the upper end thereof, a thin film of oil is deposited on the line tending to keep it clean and to prevent corrosion.

The amount of oil thus left on the line, may be adjusted or varied by adjusting the cap 10 which acts on the gland 9 and packing material 8 to compress the latter and apply just sufficient pressure to the line to maintain the proper condition of oiling thereof. When the line is withdrawn from the well, it is passed through the device and the stuffing boxes thereof, the first one of which scrapes from the line water and other foreign material which might cause corrosion, while the second stuffing box removes all except a film of oil remaining on the line and which stays on the line while it is coiled up ready for subsequent use. The caps 10 may remain loose during the threading of the line through the device, but then are screwed down tight until the proper tension is maintained on the line in passing therethrough so as to effectively clean and oil the line as it passes through the device.

The device may be mounted on a stand or in any other convenient position adjacent the well or point of use, for which purpose the casing 1 has a resilient socket 11 secured to a side thereof in which is received a ball 12 secured on a rod 13 for supporting the device. As shown in Fig. 2, the rod 13 forms a support and is secured to an adjustable frame 14 on a measuring line stand 15 which also carries the reel 16 on which the measuring line is spooled. The line extends from the reel 16 over a sheave 17 carried by the frame 14, then over a sheave 18 mounted at the top of the well casing 19 into which the measuring line extends, usually carrying a weight 20 attached to its lower end.

The measuring line is centered by the sheave 18, while the weight 20 serves as a plumb bob to direct the line downward in the casing. Where the measuring line is used on wells that produce oil or gas, it is usually necessary to provide a stuffing box 21 at the upper end of the casing 19 which thereby permits the measuring line to pass into and out of the casing without the loss of oil or gas.

By the use of this invention, the mud and other foreign matter is removed effectively from the measuring line and a desired and proper film of oil is deposited thereon each time that the measuring line passes into and out of the well, through the wiper and oiler. At the same time, the device is simple in its construction requiring only a tubular casing of small diameter with a stuffing box at each opposite end which is capable of feeding the line therethrough and of obtaining the proper adjustment on the packing around the line, and also with a suitable universal mounting for the device to enable it to accommodate itself to the inclination and direction of movement of the measuring line.

I claim:

1. A measuring line wiper and oiler comprising an elongated substantially cylindrical casing of relatively small diameter, said casing having an oil reservoir therein and extending lengthwise thereof approximately to opposite end portions of the casing, each of said end portions having a passageway therein for directing a measuring line into and through the oil reservoir, each opposite end of the reservoir being approximately conical with the apex thereof at the passageway, a packing gland surrounding said passageway for wiping the measuring line passing therethrough, and means for applying pressure to said packing gland.

2. A measuring line wiper and oiler comprising an elongated approximately cylindrical casing of relatively small diameter having an oil reservoir extending lengthwise therein approximately to opposite end portions of said casing, each of said end portions having a passageway therein adapted to direct a measuring line into and out of said reservoir, each opposite end of the reservoir being conical with the apex thereof at the passageway, each end of said casing having an enlarged opening in the outer end thereof, resilient packing material surrounding said passageway wholly within said enlarged opening, a gland extending into said enlarged opening and acting on said material to compress the same, and a cap screw-threaded on the end of the casing and acting on said gland for adjusting the pressure of the packing material on the measuring line passing therethrough.

AUTRY R. KIRKPATRICK.